United States Patent
Kodama (10) Patent No.: US 7,062,517 B2
(45) Date of Patent: Jun. 13, 2006

(54) METHOD AND APPARATUS FOR CENTRALIZED COMPUTER MANAGEMENT

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 503 days.

(21) Appl. No.: 10/219,271

(22) Filed: Aug. 14, 2002

(65) Prior Publication Data

US 2004/0034671 A1    Feb. 19, 2004

(51) Int. Cl.
     *G06F 17/30*    (2006.01)
(52) U.S. Cl. .................. 707/204.1; 707/202; 713/200; 711/114
(58) Field of Classification Search ................ 707/202, 707/204; 713/2, 155, 164, 200, 201; 711/114; 714/6
See application file for complete search history.

(56) References Cited

U.S. PATENT DOCUMENTS

| | | | |
|---|---|---|---|
| 5,430,871 A | | 7/1995 | Jamoussi et al. |
| 5,771,354 A | | 6/1998 | Crawford |
| 5,878,434 A | | 3/1999 | Draper et al. |
| 5,901,228 A | | 5/1999 | Crawford |
| 5,991,771 A | | 11/1999 | Falls et al. |
| 6,029,231 A | | 2/2000 | Blumenau |
| 6,105,130 A | * | 8/2000 | Wu et al. ...................... 713/2 |
| 6,115,741 A | * | 9/2000 | Domenikos et al. ......... 709/217 |
| 6,163,856 A | | 12/2000 | Dion et al. |
| 6,192,365 B1 | | 2/2001 | Draper et al. |
| 6,385,707 B1 | * | 5/2002 | Maffezzoni ................. 711/162 |
| 6,542,962 B1 | * | 4/2003 | Kodama et al. ............ 711/114 |

OTHER PUBLICATIONS

Briefcase Data Transfer System and Icon Interface, IBM Technical Disclosure Bulletin, Apr. 1994, pp. 447-448, vol. 37, PubNo. 4A.
IBoot—Remote Boot Over iSCSI, IBM, website page http://www.haifa.il.ibm.com/projects/storage/iboot/index.html.
John G. Spooner, IBM Offers Data Storage Alternative, website page http://news.com.com/2102-1001-929107.html.

* cited by examiner

*Primary Examiner*—Jeffrey Gaffin
*Assistant Examiner*—Hassan Mahmoudi
(74) *Attorney, Agent, or Firm*—Townsend and Townsend and Crew LLP (57) ABSTRACT

Centralized data management for personal computers (PCs) includes selectively booting up from a remote disk drive component. Subsequent copy operations of data blocks from the remote disk drive component to a local disk drive in a PC can be performed to obtain an updated disk image from the remote disk. Subsequent copy operations of data blocks from the local disk drive to the remote disk can be performed to ensure that a current image of the local disk is maintained on the remote disk.

10 Claims, 14 Drawing Sheets

METHOD AND APPARATUS FOR CENTRALIZED COMPUTER MANAGEMENT

BACKGROUND OF THE INVENTION

The present invention relates generally to computer systems and more specifically to management of computers organized in a distributed architecture.

Today, because of expanding use of the personal computer (PC) as a tool for work, PCs have become ubiquitous in most enterprises. Typically, PCs are distributed throughout the enterprise, where potentially thousands of employees may have their own PC. It is a problem of IT managers to manage so many PCs. An important concern for IT managers, for example, is management of the PCs, especially the management of certain critical data that the PCs may contain. Examples of management tasks include:

computer virus checking;
  data backing up;
  configuration of files;
  installing, upgrading and uninstalling software;
  sharing PC's local data by other users; and
  analyzing PCs' data.

A typical PC includes a local disk drive in its chassis, where all of the user's data is usually stored. The data in the local disk drive typically can be accessed by only the PC itself. Consequently, most of the software that provide the above data management functions must be installed on the PC and executed by the PC itself. As a result, it is up to the user of the PC to decide whether the software is executed or not. Thus, some users may not perform virus checking or execute back ups of their data. Such lacking in discipline can be disastrous if, for example, the PC becomes infected with a software virus. The potentially malicious software can spread to other PCs in the network. Thus, virus checking should be performed diligently and completely, without exception.

Another challenge for the IT manager is that such task may consume too much time to perform. For example, baking up files may be deemed too disruptive. The tendency therefore is to forego certain activities, such as performing backups.

Another problem is that most software requires installation by the user or the IT personnel. If a user is required to perform the task, it may not be performed correctly or completely, or at all. This further burdens the IT department.

Still another problem is that there is oftentimes valuable data on a PC which should be accessible to other members of the enterprise. It would be desirable to be able to share the data or allow others access to the data.

Several conventional techniques exist for managing a network of computers from a centralized computer. For example, there is a network based client-server configuration (such as a Unix-based machine) which allows client computers to boot without any local disk drive in the client machine. The data required is served from a remote disk drive at a central NFS server. The IT administrator simply installs and manages software on the remote disk drive and is guaranteed that the installation will reach its client machines. There is no need to do anything by the users or by the client computer. Since there is no local disk, there is a performance tradeoff due to the slower access of having a remotely located "local" drive.

A company called Network Appliance, Inc. sells a product which provides virus scan functionality for its network attached storage (NAS) devices. The NAS is a central file storage system and the PCs store their files in the NAS for sharing data purpose. The NAS works with an external server which can scans virus. Before any file is used by the PC, the NAS asks the external server if there is any virus in the file and if not, the PC can use the file. If a virus is detected, the virus is removed from the file if possible so that the PC can then be given a cleaned file. This technique requires all files to be stored remotely so that the virus scan operation can be performed. There is a performance hit due to the fact that the file is remotely accessed. More significantly, operating system (OS) files are not stored remotely on the NAS, and so any virus that finds its way into such files cannot be screened.

It can be appreciated then that there is a need for an improved approach to managing a distributed network of computer systems without experiencing a degradation in performance.

SUMMARY OF THE INVENTION

In various implementations of embodiments according to the present invention, a centralized data management system for personal computers (PCs) includes selectively booting up from a remote disk drive component. Subsequent to the boot up sequence, copy operations of data blocks from the remote disk drive component to a local disk drive in a PC can be performed to obtain an updated disk image from the remote disk. During operation of the PC, subsequent copy operations of data blocks from the local disk drive to the remote disk can be performed to ensure that changes made to the local disk drive are reflected on the remote disk.

DESCRIPTION OF THE SPECIFIC EMBODIMENTS

For the purposes of explaining the present invention, it can be assumed without loss of generality, that a PC has its own local disk drive in its chassis and a replication of data in the local disk drive is made on a remote disk drive that is located in a central storage system. As will be explained, the PC can reach the remote disk drive via a network. A logical volume manager (LVM) can be used in the operating system to manage the local disk drive and the remote disk drive. The LVM performs its tasks at the kernel level and is therefore transparent to the applications.

As will be seen, there is a central data manager in the system which can access the remote disk drives in the central storage system via a network. When the PC has been turned off, the central data manager processes the management tasks for the remote disk drive of the PC. The central data manager executes the management software on it and the software treats data on the remote disk drive. The software can be anything including virus check program, data backup program, OS configuration program, application software management program, data gathering program, data analyzing program and so on.

If the data on the remote disk drive was changed, the PC can be notified of the changes when it is turned on. The changes are shown in the first bitmap table that is stored on the remote disk drive. A Sync daemon in the LVM keeps the logical disk drive and the remote disk drive the same, meaning changed data on the remote disk drive are copied to the logical disk drive by using a first bitmap table.

When the user of the PC reads data, the I/O daemon of the LVM reads the requested data from the local disk drive if it contains the most current data. Otherwise, it is read from the remote disk drive.

When the user writes data, the LVM writes the data to the local disk drive and immediately conveys a completion indication of the write request to the user without waiting for the data to be written to the remote disk drive. The Sync daemon copies the write data to the remote disk drive. A second bitmap table shows which data should be copied to the remote disk drive.

The I/O daemon and the Sync daemon execute independently. So even if there is a lot of data that should be copied from the remote disk drive to the local disk drive, the applications can start immediately after the PC started.

Figure 1:
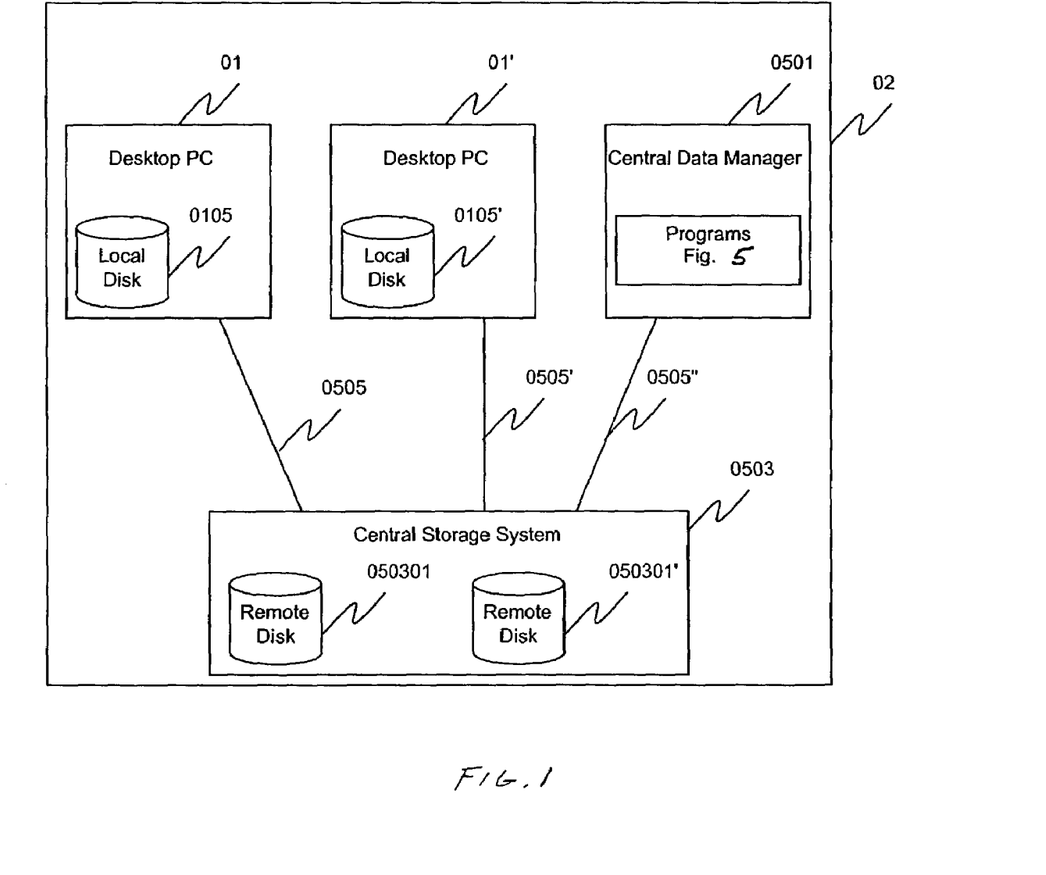
FIG. 1 is a high level system block diagram of an example of a centralized data management system in accordance with the present invention.

FIG. 1 illustrates a high level block diagram of a distributed computer system 02, incorporating various aspects of the present invention. The system includes one or more personal computer (PC) devices 01, 01' in data communication with a central storage system 0503. There is a central data manager 0501 which is also in data communication with the central storage system. Though the figure shows one central storage system, it is noted that one or more additional central storage systems can be provided. In the case of multiple central storage systems, it is understood that the central data manager would be in data communication with each storage system. The PC devices can be any kind of computing device including Microsoft-based PCs, Apple PC's, Unix machines, and so on. The PC devices can be portable devices such as laptops, personal data assistants (PDA's) such as a PalmPilot, and so on.

The data communication can be provided by any appropriate communication technique. For example, desktop PC's can use any of a number of known types of network connections, such as a local area network (LAN), a virtual private network (VPN), a fibre channel based network (e.g., storage area networks, SAN's), a wide area network (WAN), and so on. It can be appreciated that other kinds of communication channels 0505, 0505', 0505" can be used such as wireless connections. Likewise, any appropriate communication protocol can be used, whether it is a proprietary protocol or not. The particular communication protocol may depend on the particular physical equipment being used. For example, in the case of a LAN and VPN, iSCSI can be used. In the case of a SAN, SCSI can be used.

The PC's 01, 01' may include one or more local drives 0105, 0105'. Typically, these drives are formatted into one or more partitions. For convenience, it will be assumed that the PC has only one local drive with one partition defined on that drive. It can be appreciated from the following that additional local drives can be readily accommodated.

The central storage system 0503 comprises one or more remote disk drives 050301, 050301'. In a particular implementation of an embodiment according to the present invention, for each local drive among the PC's in the system 02, there is a corresponding remote disk drive in the central storage system. Thus, for example, the remote disk drive 050301 might correspond to the local drive 0105 in PC 01 and the remote disk drive 050301' might correspond to the local drive 0105' in PC 01'.

Figure 2:
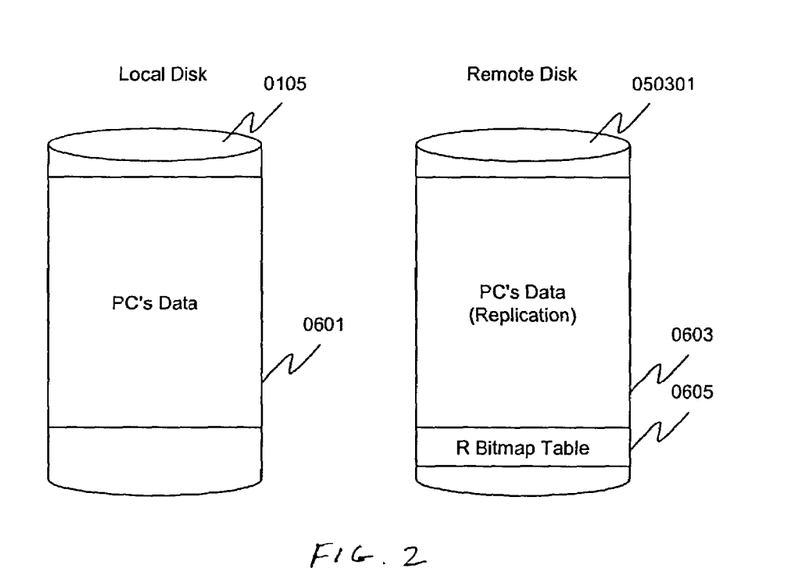
FIG. 2 illustrates the data storage relationship between a local disk drive and a remote disk drive.

Each remote disk drive replicates the data in its corresponding local drive. In addition, each remote disk drive includes an area for storing an R bitmap. Referring to FIG. 2 for a moment, a side-by-side illustration of a local disk drive 0105 and its corresponding remote disk drive 050301 is shown. The figure illustrates that the data area 0601 of the local drive is replicated in a data area 0603 on the remote disk drive. The figure further shows that an R bitmap table is associated with the replicated data. As shown in the figure, the R bitmap table resides in an area 0605 on the remote disk drive, which can be on the same drive as the replicated data. It is worth mentioning at this point that the physical disks for the local and remote drives need not be identical. It is important only that the image of the data area 0601 of the local disk drive be replicated on the remote disk drive. A consequence of this observation is that a sufficiently large remote disk drive can be appropriately partitioned or otherwise configured to replicate the data from two (or more) local drives, each replicated data being associated with its own R bitmap table. Alternatively, the image can even be contained across two or more remote disk drives. For simplicity, and without loss of generality, the discussion will assume a one-to-one correspondence between local disk drive and remote disk drive.

Figure 3:
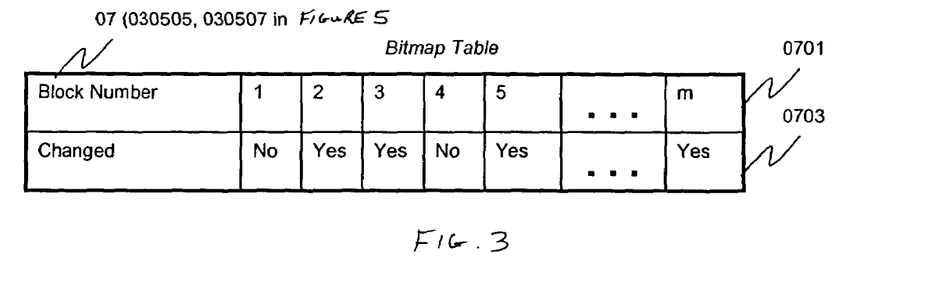
FIGS. 3 and 4 show bitmap tables in accordance with the invention.

FIG. 3 illustrates the fields of the R bitmap table introduced in FIG. 2. In fact, there is an L bitmap table, as will be explained. Before continuing with this discussion, a brief explanation of data access on a disk drive is provided. The data on a disk drive, whether it is the local disk drive or a remote disk drive, is conventionally organized into blocks of data. Each block can be referenced (addressed) by its block number. The block is a unit of data that is written or read in one I/O operation. Generally, the block size is some multiple of 512 bytes; e.g., 1KB, 4KB, 1MB, etc. The data space of the disk drive is divided to multiple blocks and each block has its associated number. The operating system uses the block number to specify a location of data that the operating system wants to access.

Turning now to FIG. 3, the format for a bitmap table 07 is shown. The table comprises two rows of M columns 0701, M being the number of blocks of the data area in the local disk drive that is to be replicated on the remote disk drive. For each block, there is a block number field in the table and a Changed field 0703. As will be explained below, the Changed field indicates that the block in the local disk drive and the corresponding block in the remote disk drive are different. FIG. 2 shows that there is an R bitmap table associated with the image (replication) 0603 that is stored on the remote disk drive. The R bitmap table indicates each block (for example, by having YES in the Changed field) that has more recent data than its corresponding block on the local disk drive. Though it is not shown in FIG. 2, the local drive has an L bitmap table which contains similar information as the R bitmap table. Thus, when a block on the local disk drive contains more recent data than the corresponding block on the remote disk drive, the corresponding Changed field in the L bitmap table is set to indicate YES; e.g. a bit is set to a logical '0' or a logical '1'. A NO in the Changed field of either bitmap table indicates that the data is identical between the local disk drive and the remote disk drive.

As will be explained below, the PC 01 can boot from either the local disk drive or the remote disk drive. If the data on the remote disk drive has been changed by the central data manager 0501, the PC will boot from the remote disk drive. Otherwise, the PC boots from the local disk drive. The R bitmap table is consulted by the PC to make this determination.

In accordance with the invention, the central data manager 0501 can access the remote disk drive only when it is not being used by the PC 01. Conversely, the PC can access the remote disk drive only when it is not being accessed by the central data manager.

Figure 4:
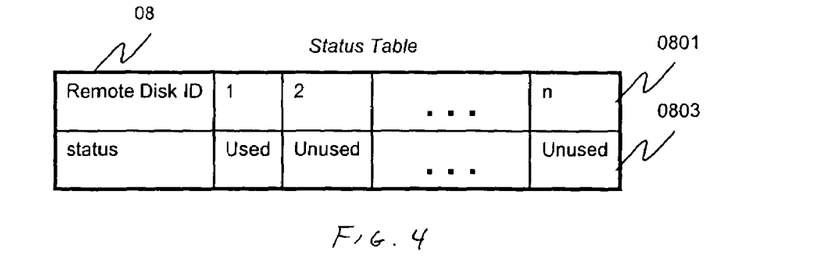

FIG. 4 shows the format for a status table 08 that is managed by the central data manager 0501. The status table indicates which remote disk drives are currently in use, either by a PC or by the central data manager itself. An identification field 0801 contains an identifier associated with the remote disk drive. A status field 0803 indicates USED or UNUSED, depending on whether or not the remote disk drive is being used. UNUSED indicates that the remote disk drive is not being accessed by either a PC or the central data manager. It is worth noting, that if a remote disk drive has two or more partitions, each column in the status table will contain a row for each partition.

Figure 5:
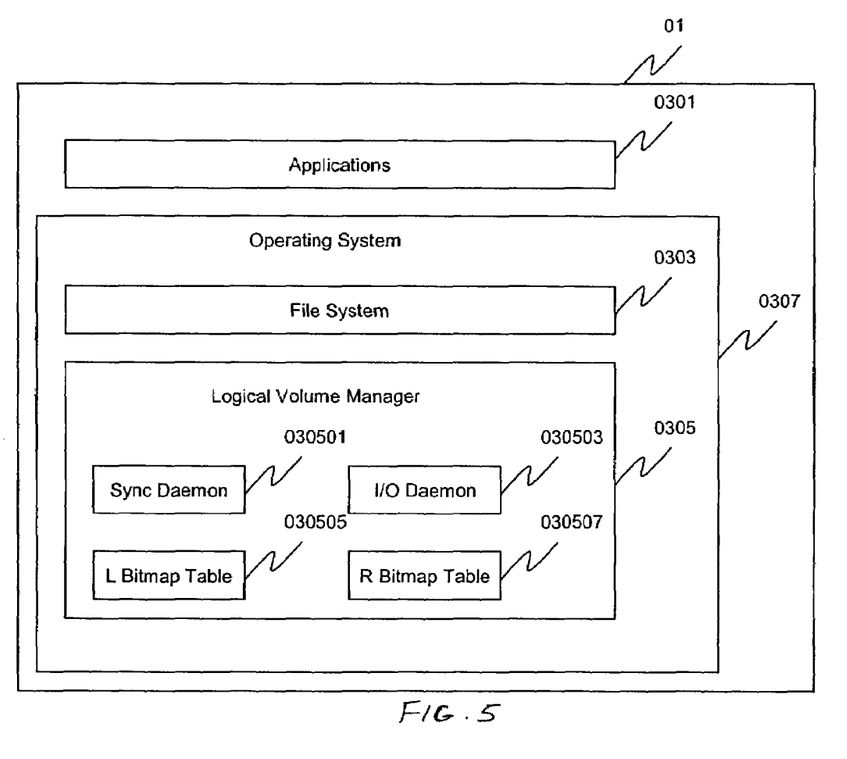
FIG. 5 illustrates the software components of an embodiment of the system in accordance with the present invention.

FIG. 5 is a generalized diagram illustrating the software components of the PC 01. Generally, the operating system (OS) 0307 constitutes the core software that manages the PC's hardware components and provides services to other software components. Applications 0301 operate in the environment provided by the OS. The OS includes a file system 0303 and a logical volume manager (LVM) 0305. The file system receives file I/O requests from applications and processed them to fulfill the request. The LVM receives block I/O requests from the file system and processes the requests on behalf of the file system. It is noted that the LVM component can be provided to existing OS without modification to the file system component.

As part of the boot process, the OS initializes the LVM. Two daemons are started: a Sync daemon 030501 and an I/O daemon 030503. The Sync daemon is responsible for creating the image (replication) of a PC's local disk drive and storing it on the remote disk drive. The I/O daemon processes requests from the file system. The two daemons have access to the L bitmap table and the R bitmap table, as will be explained below. In order to ensure data integrity, access to the bitmap tables can be controlled using a locking mechanism such as semaphores.

Figure 6:
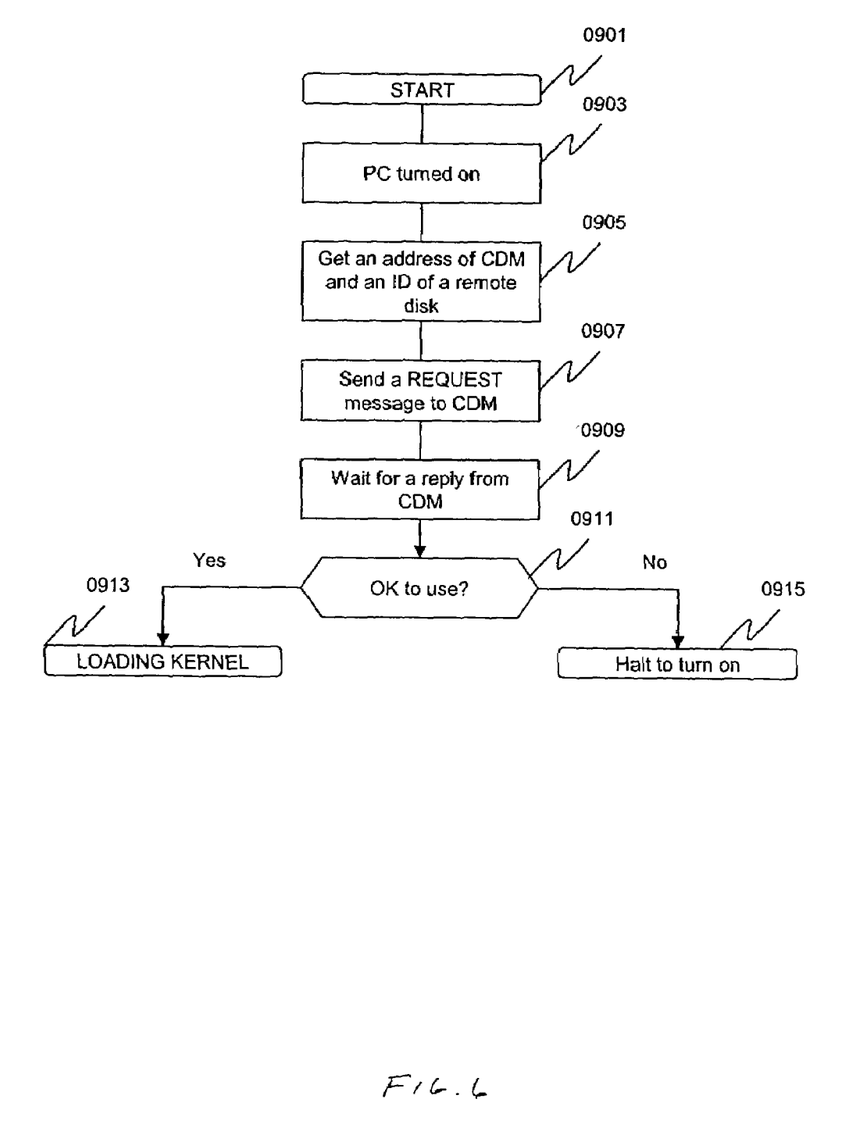
FIG. 6 illustrates the basic steps for a computer boot sequence in accordance with present invention.
Figure 7:
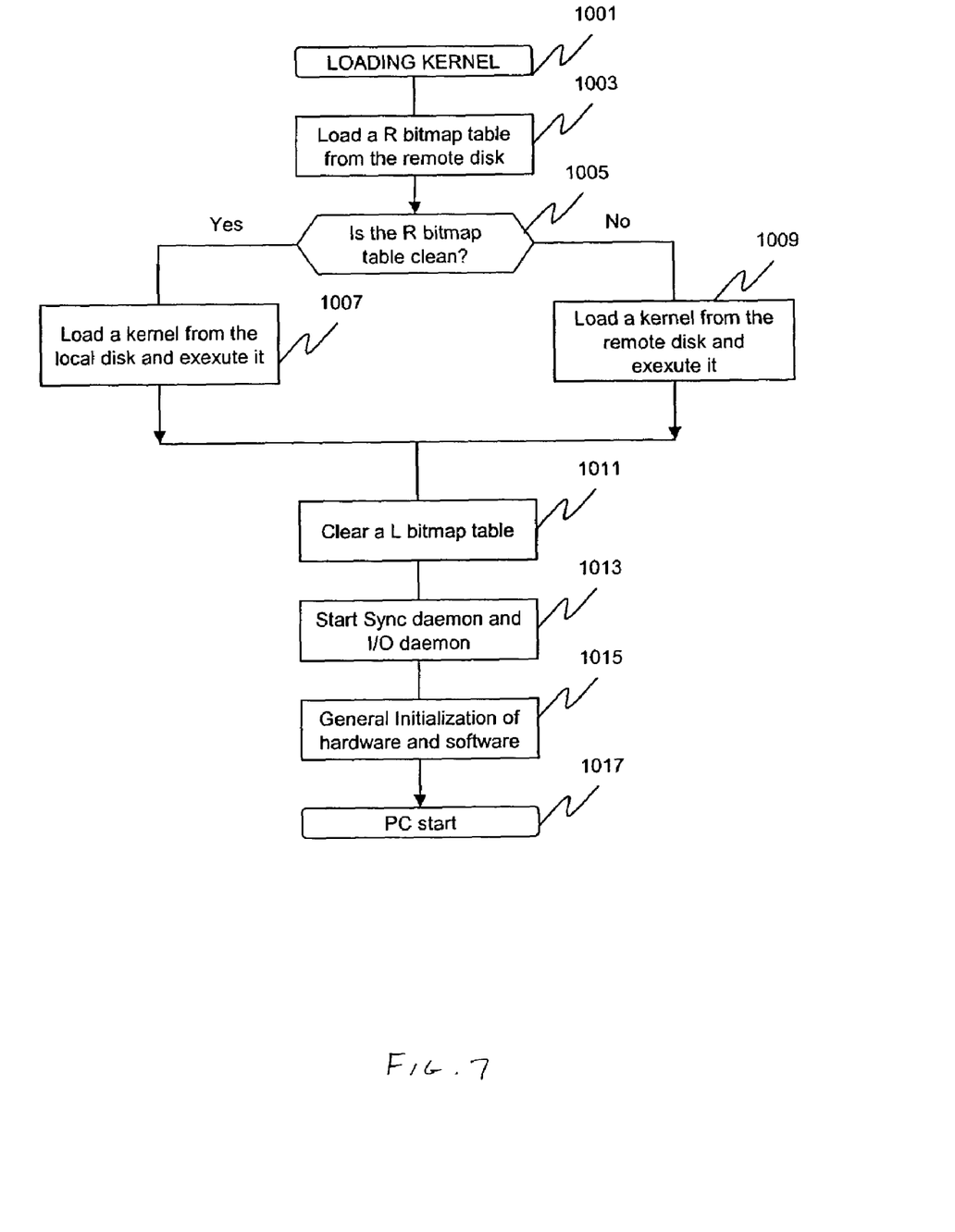
FIG. 7 illustrates the basic processing during the loading of the kernel according to an embodiment of the present invention.

FIG. 6 and FIG. 7 are flow charts illustrating generally the processing during the boot process of a PC. In FIG. 6, when power is applied to the PC in a step 0903, the BIOS (basic I/O system) or some similar software performs a boot up sequence. In a typical PC, the BIOS is executable code that resides in a read-only memory (ROM) or some similar non-volatile memory component. In accordance with and implementation of an embodiment of the invention, the BIOS code obtains an address (e.g., an IP address) of the central data manager (CDM) 0501 and the ID of its corresponding remote disk drive (step 0905). This information can be obtained using a protocol similar to DHCP (dynamic hardware configuration protocol).

In a step 0907, the BIOS sends a message containing the ID of the remote disk drive to the CDM to determine if the remote disk drive is busy. The BIOS waits (step 0909) for a reply from the CDM before proceeding. If the reply from the CDM indicates (step 0911) that the remote disk drive is not busy, then the BIOS proceeds to load the kernel software in a step 0913 from the remote disk drive to perform the boot sequence. If the remote disk drive is indicated as being busy, then the PC halts the boot process (step 0915).

FIG. 7 illustrates the general steps for loading the kernel. In a step 1003, the BIOS reads the R bitmap table from its corresponding remote disk drive. If none of the Changed fields 0703 in the table indicates YES, indicating that the local disk drive and the remote disk drive have the same image, then in a step 1007 the BIOS continues the boot up sequence on the local disk drive, loading the kernel from the local disk. If any of the fields is set to YES (step 1005), then the processing proceeds to step 1009. In step 1009, when the remote disk drive contains some recent data not on the local disk drive, the BIOS loads the kernel from the remote disk drive.

Next, in a step 1011, after the kernel has loaded, the L bitmap table of the local disk drive is cleared; i.e., all the Changed fields 0703 are set to NO. The Sync daemon and the I/O daemon are then started, in a step 1013. Other commonly known initialization procedures are performed in a step 1015 to start initialize the hardware and other software components of the OS. When initialization has completed, the PC starts (step 1017) user level applications; for example, some sort of user interface application can be started.

Figure 8:
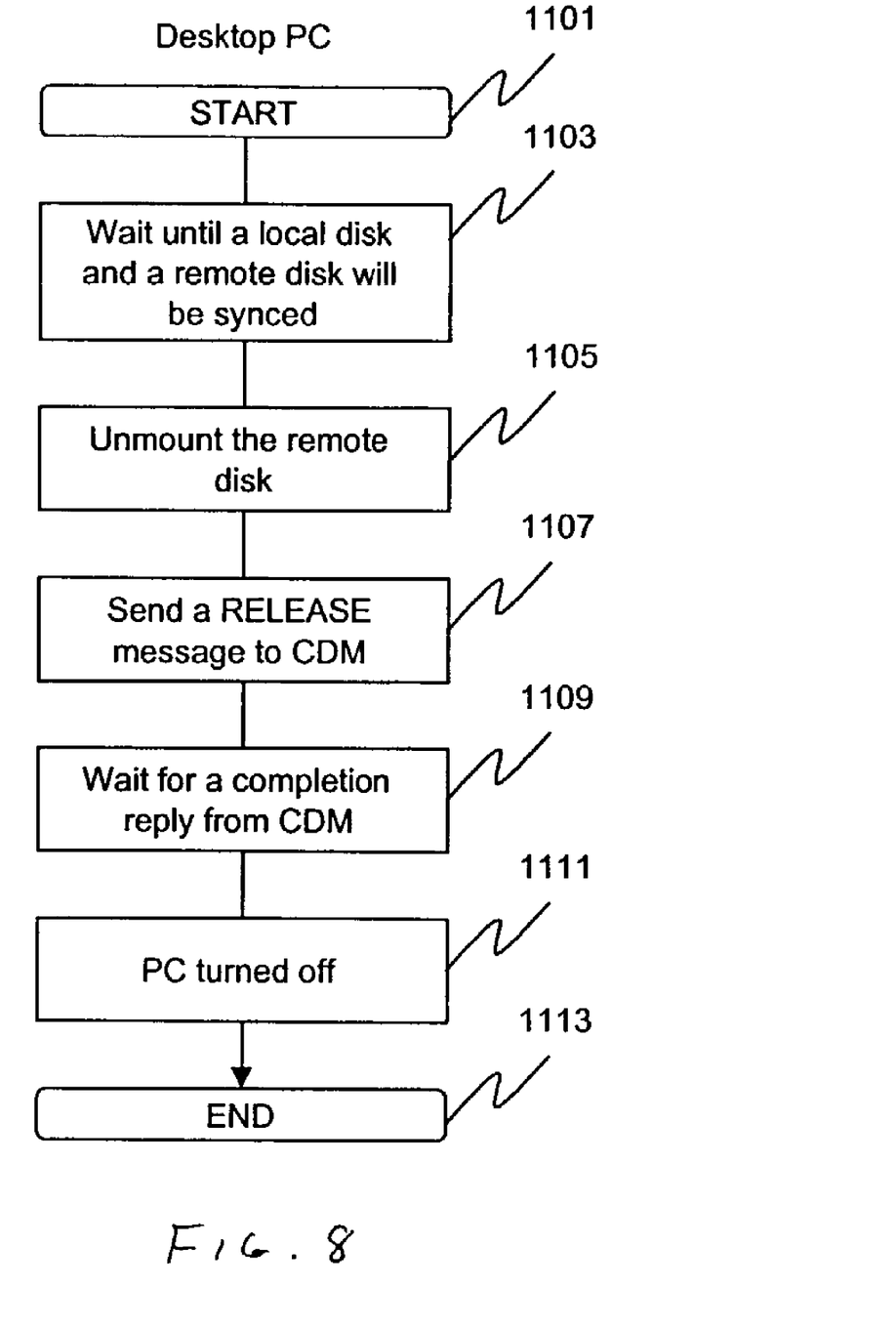
FIG. 8 is a flow chart highlighting the sequence for shutting down a computer.

FIG. 8 illustrates the general sequence for shutting down the PC. When the PC receives a signal to shutdown, the kernel is signaled and waits until the local disk drive and the remote disk drive are synced (step 1103), after which time both drives will have the same image. Then, in a step 1105, the kernel unmounts the remote disk drive from the PC. A release message is sent to the CDM in a step 1107 to indicate that the PC is no longer using the remote disk drive. The kernel waits for the CDM to reply with and acknowledgment (step 1109), afterwhich the shutdown continues to completion (step 1111).

Figure 9:
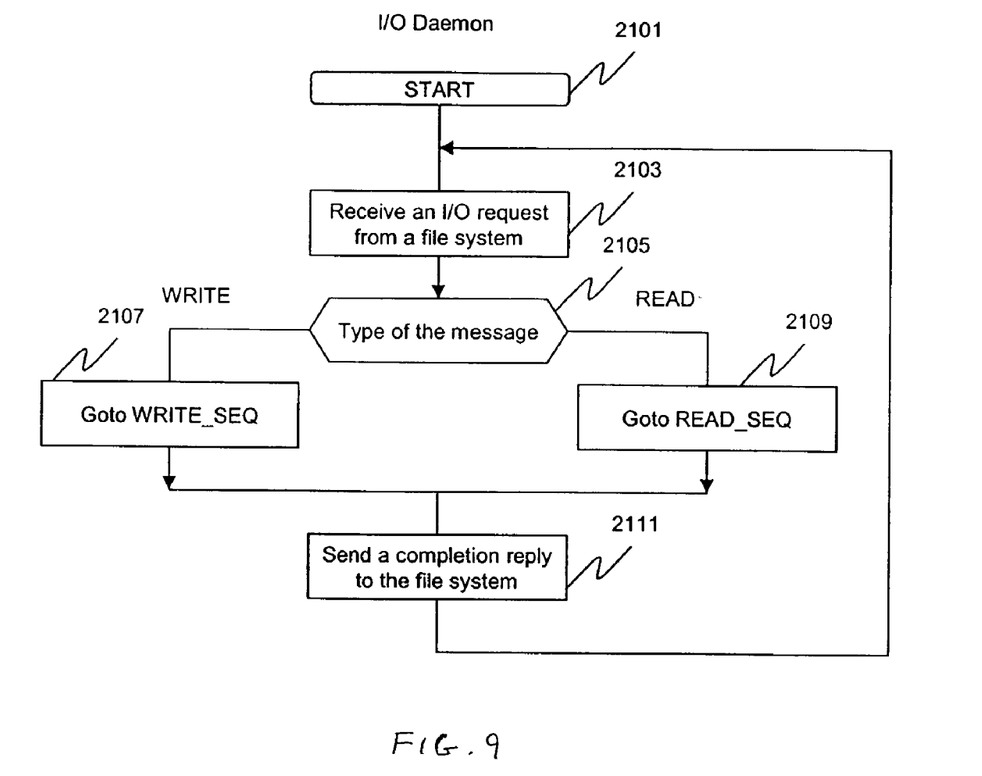
FIGS. 9–11 are flow charts highlighting the process steps for an I/O daemon according to the present invention.

FIG. 9 illustrates the general processing steps performed by the I/O daemon 030503 (FIG. 5). The I/O daemon exists in a wait state until it receives an I/O request from the file system (step 2103). The I/O daemon then determines in a step 2105 whether the request is a WRITE request or a READ request. A WRITE request will initiate a WRITE_SEQ routine (step 2107), while a READ request initiates processing in a READ_SEQ routine (step 2109). After the appropriate routine is completed, an appropriate response is returned to the file system in a step 2111. The I/O daemon then returns to its wait state for the next I/O request.

Figure 10:
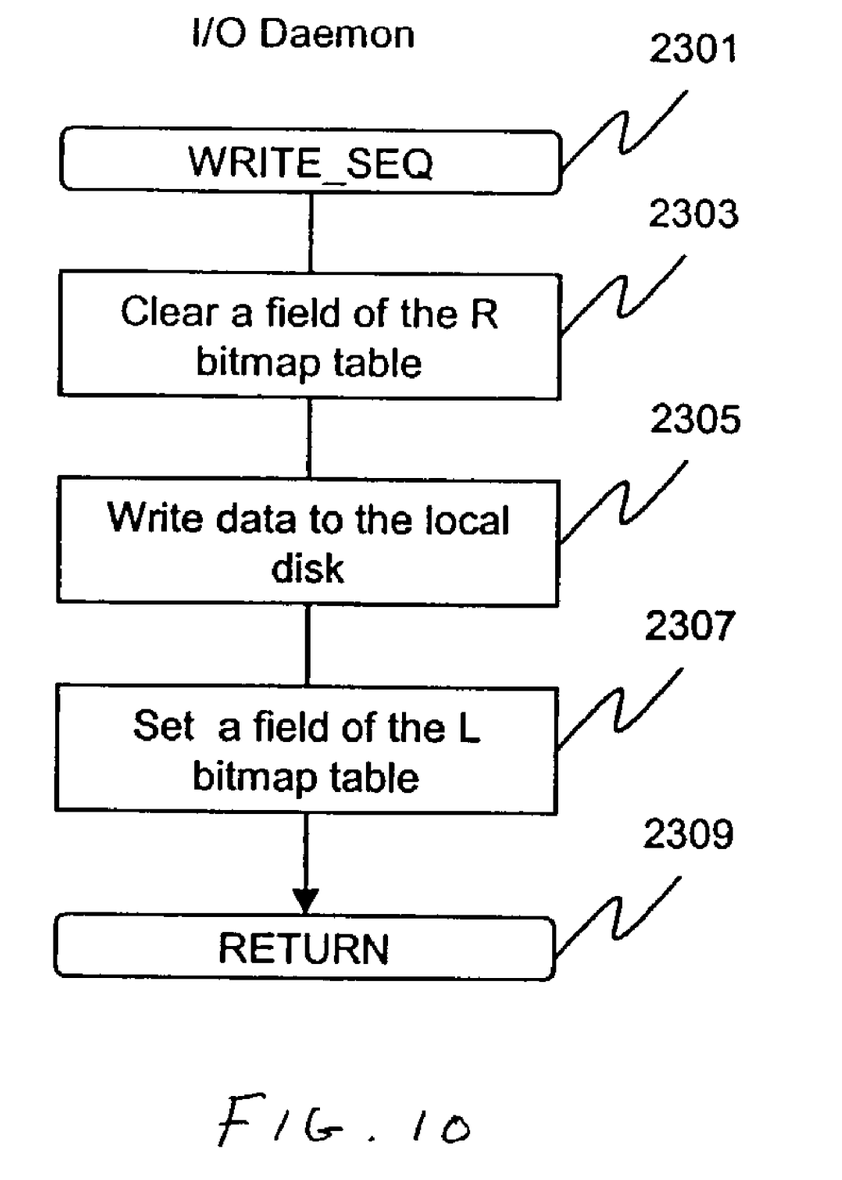

FIG. 10 highlights the processing of the WRITE_SEQ routine. When this routine is called, I/O daemon clears the Changed field corresponding to the block number being written in the R bitmap table in memory in a step 2303. The request from the file system includes the block number of the block to be written. As will be explained, clearing the field in the R bitmap table prevents Sync daemon from copying data stored in the corresponding data block of the remote disk drive (which is now out of date) to the local disk drive.

The routine then performs the write operation, writing data to the specified location of the local disk drive in a step 2305. Then in a step 2307 the Changed field of the block number in the L bitmap table is set to YES, thus causing the Sync daemon to copy the data from the local disk drive to the remote disk drive. It is worth noting that this routine can be written to handle writing more than one block at a time.

Figure 11:
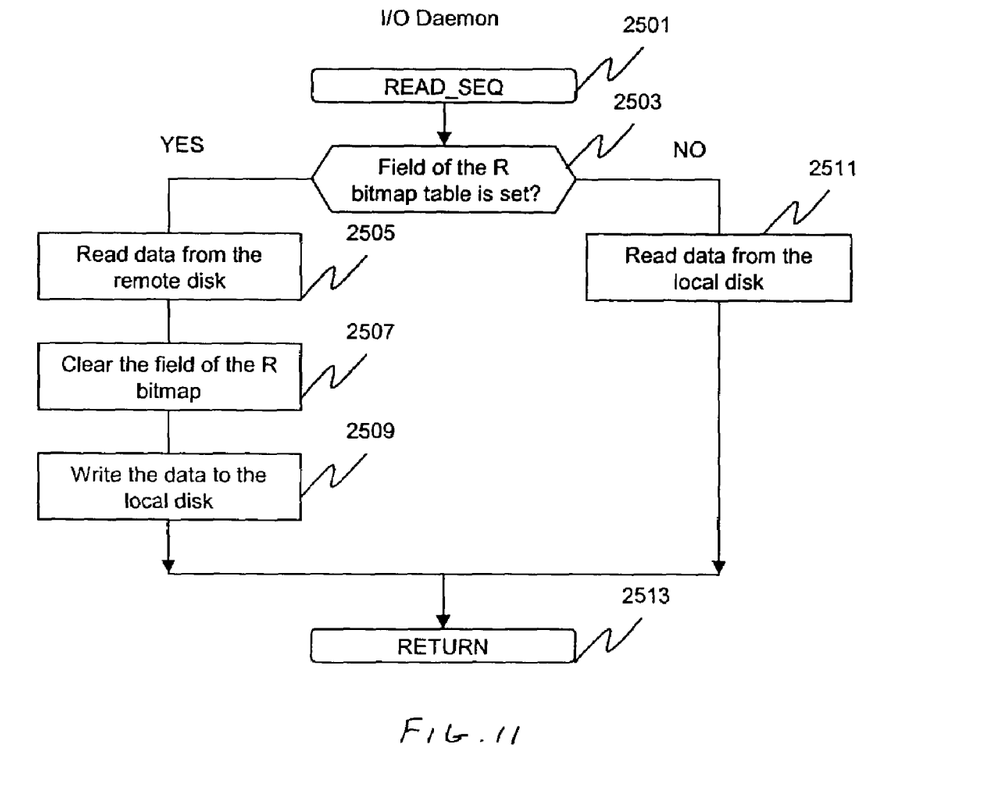

FIG. 11 highlights the processing of the READ_SEQ routine. When this routine is called, the I/O daemon checks in a step 2503 if the Changed field of the corresponding block in the R bitmap is set or not. If the field is not set, the I/O daemon simply reads the data from the local disk drive in a step 2511. If the Changed field is set, then the routine reads data from the specified location of the remote disk drive (step 2505) and clears the field of the R bitmap table (step 2507). The data read from the remote disk drive is then written to the local disk drive in a step 2509. The foregoing sequence serves to (1) satisfy the read request by providing the most current data, which resides on the remote disk drive and (2) lighten the load of the Sync daemon 030501 by performing the copy to the local disk drive and clearing the bit in the R bitmap table. While (2) does not have to be performed, it may be desirable to do so from an efficiency point of view. Remote access operations consume system resources, network resources, and remote storage resources, so one may as well perform the operation since the connection is already made.

Figure 12:
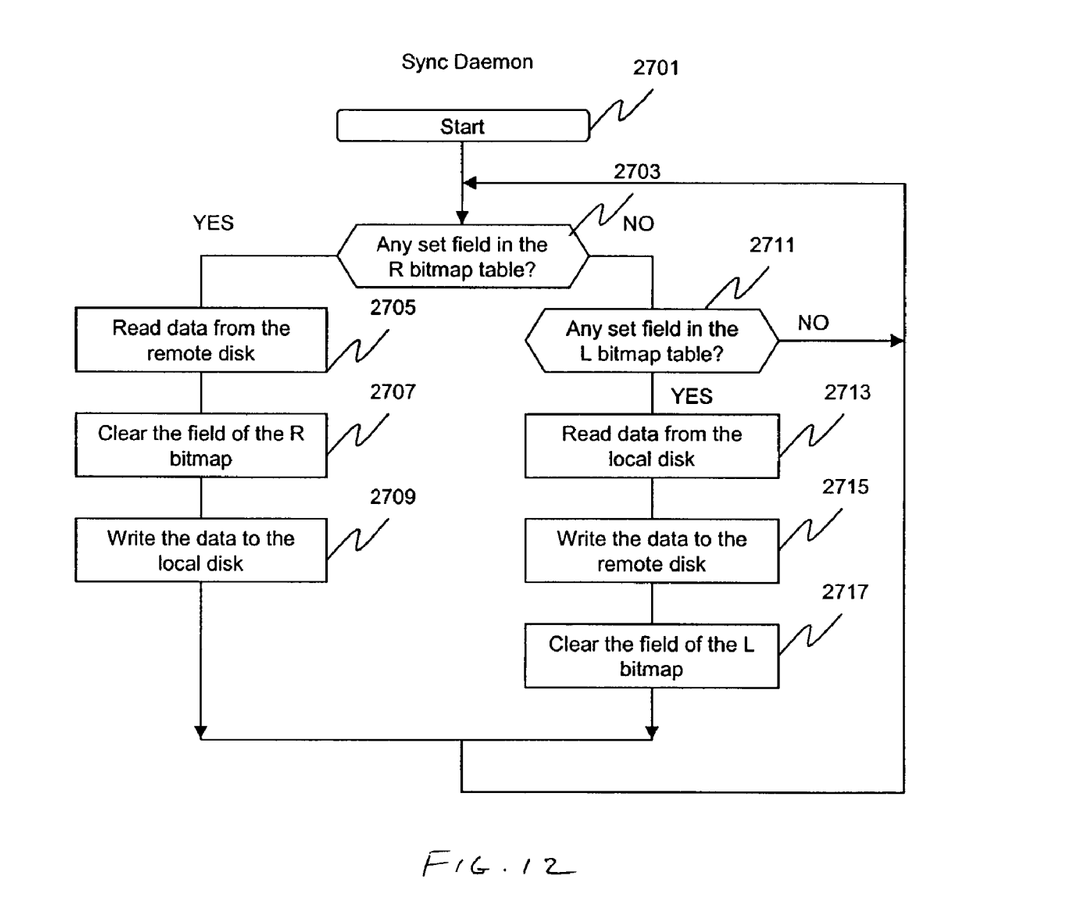
FIG. 12 is a flow chart highlighting the processing for a Sync daemon according to the present invention.

FIG. 12 illustrates the general processing steps of the Sync daemon 030501. After the daemon starts, it periodically checks if any of the Changed fields in the R bitmap table (step 2703) or in the L bitmap table (step 2705) are set. If there is such a field in the R bitmap table, the Sync daemon reads data from the corresponding block on the remote disk drive in a step 2705 and then clears the field of the R bitmap table (step 2707). The data is then written to the local disk drive in a step 2709. Similarly, if a Changed field in the L bitmap table is set, the Sync daemon reads data from the corresponding block on the local disk drive in a step 2713 and writes the data to the remote disk drive in a step 2715. The Changed field in the L bitmap table is then cleared in a step 2717.

Figure 13:
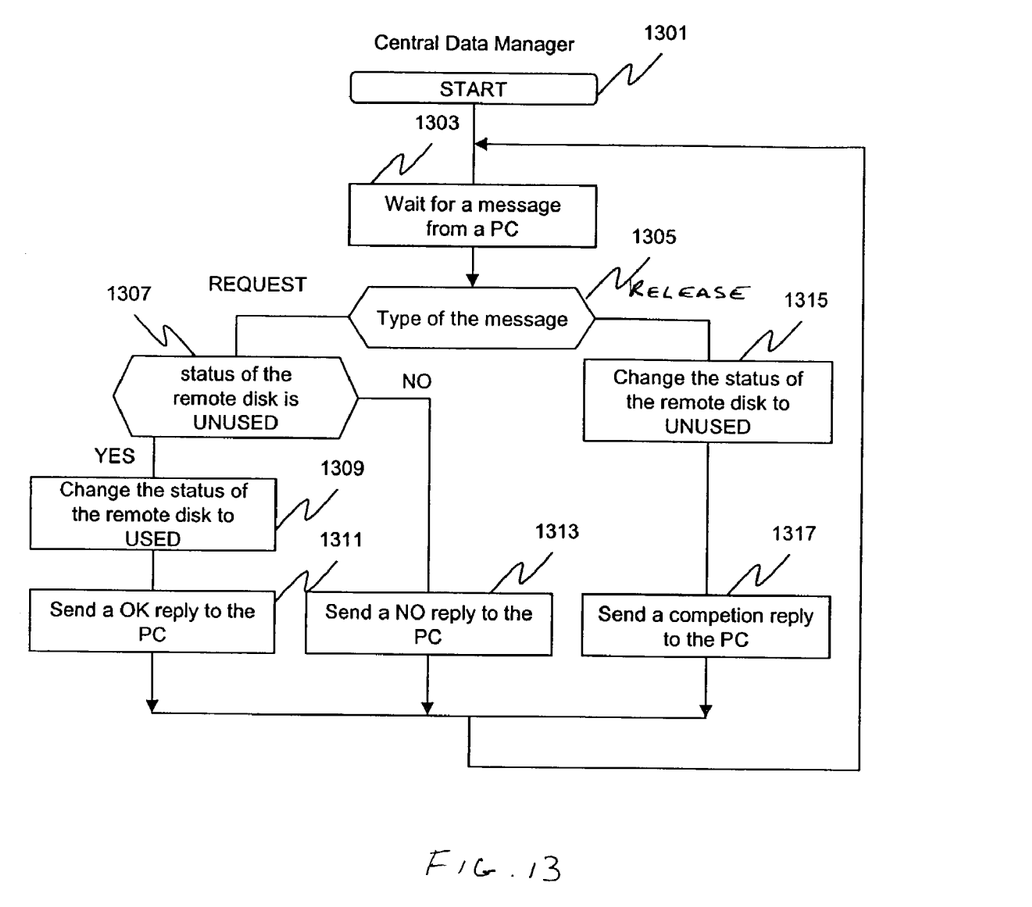
FIG. 13 is a flow chart highlighting the processing for an implementation of central data manager in accordance with the present invention.

FIG. 13 illustrates the main processing steps of the central data manager (CDM) 0501. When the CDM starts, it waits for a message from a PC in a step 1303. If a message is received, it checks the type of the message (step 1305). If the type is REQUEST, it also checks if the status (in the status table 08, FIG. 4) of the requested remote disk drive is UNUSED (step 1307). If it is UNUSED, the CDM changes the status to USED (step 1309) and sends a message with OK (i.e., an acknowledgment reply) to the PC in a step 01311. If the status is USED, the CDM sends a negative reply to the PC in a step 01313. If the type of the message is RELEASE, it changes the status of the remote disk drive to UNUSED (step 1315) and then sends an acknowledgment reply to the PC in a step 1317. The CDM then repeats the foregoing steps.

The discussion will now turn to an explanation of the operation of the central data manager 0501 in the management of data between the local disk drives of the PC's and the remote disk drives in the one (or more) central storage system 0503 in terms of various maintenance tasks. A typical IT (information technology) manager performs many tasks in order to ensure reliable and continued operation of the PC's for which she has responsibility. The centralized system in accordance with the embodiments of the present invention facilitate the IT manager's tasks. As can be appreciated from the following sample of scenarios, the remote disk 050301 (FIG. 1) becomes available when its corresponding PC is turned off. This provides the IT manager with an opportunity to perform her maintenance tasks for that PC. When the PC boots up, changes to the remote disk are implemented on the PC.

Figure 14:
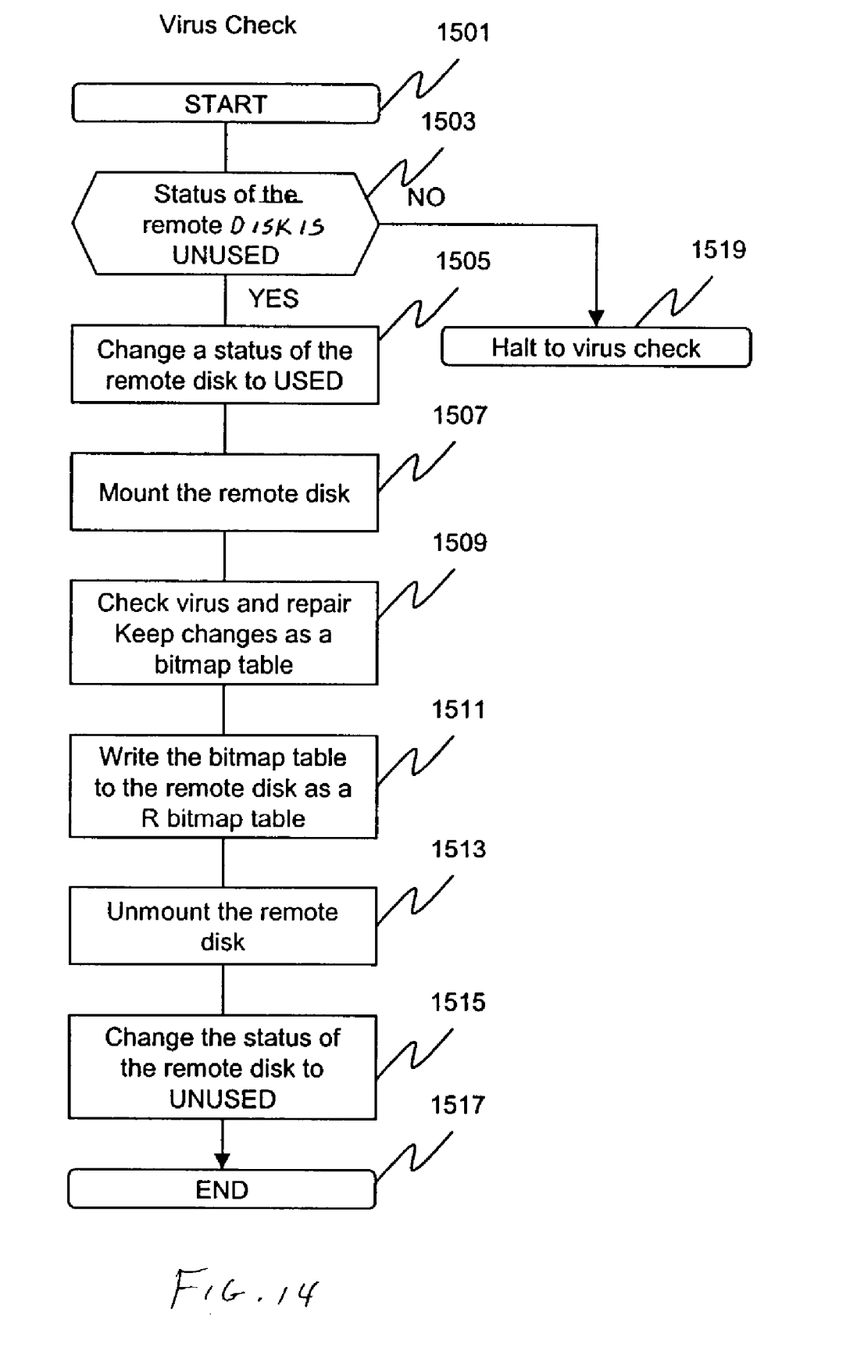
FIGS. 14–16 illustrate the general processing steps for various activities on a central data manager according to the present invention.

FIG. 14 shows a maintenance scenario in which virus checking is provided. First, a check is made (step 1503) to determine if the remote disk is in use or not. If the remote disk is in use, then the virus check process is simply halted in a step 1519. If the remote disk is available, then the status of the remote disk is changed to USED in a step 1505. The remote disk is mounted (step 1507) onto a directory on the central data manager 0501 CDM. Virus checking is performed on the remote disk using a conventional virus checking program(s), in a step 1509, and repairs are made as needed. If changes are made, the corresponding entries in the R bitmap table 030507 of the changed blocks are appropriately marked to indicate that the blocks have been modified (step 1511). The disk is then unmounted in a step 1513 and the status of the disk is changed to UNUSED (step 1515).

When the PC boots up (per the processing summarized in FIG. 7), the LVM in the PC will detect that changes in its remote disk have been made. During the normal course of processing by the Sync daemon (FIG. 12) the changed blocks contained on the remote disk will be copied to the local boot disk of the PC. In this way, virus checking maintenance performed by the IT manager can be propagated to the PC without requiring direct interaction between the IT manager and the PC. Thus, the IT manager can perform her duties without interference from the PC user and without impact to the PC user's activities.

Figure 15:
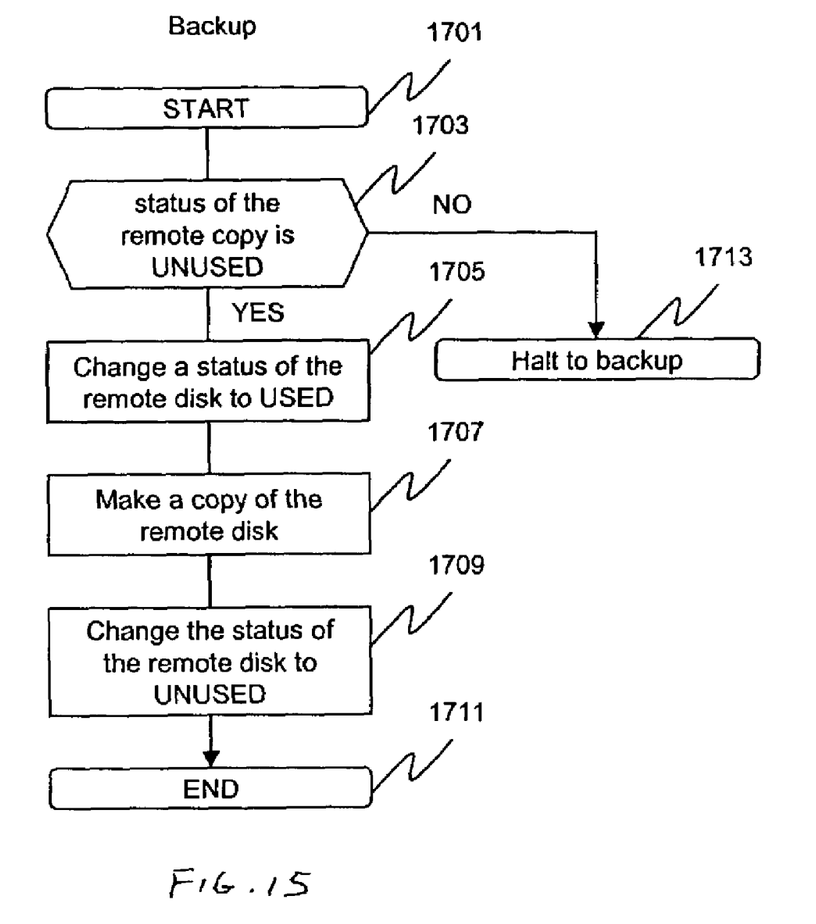

FIG. 15 illustrates backup processing. The status of the remote disk corresponding to the PC to be backed up is checked in a step 1703. If the remote disk is in use, then the process simply stops, step 1713. Otherwise, the remote disk is mounted by the CDM 0501 and marked as USED (step 1705). At that point, a conventional backup procedure can performed on the remote disk in a step 1707. Upon completion of this task, the remote disk is then unmounted and marked as UNUSED, step 1709. It is noted that typically, a backup does not alter the disk being backed up. Therefore, none of the blocks are changed and so there is no update in the bitmap tables.

Figure 16:
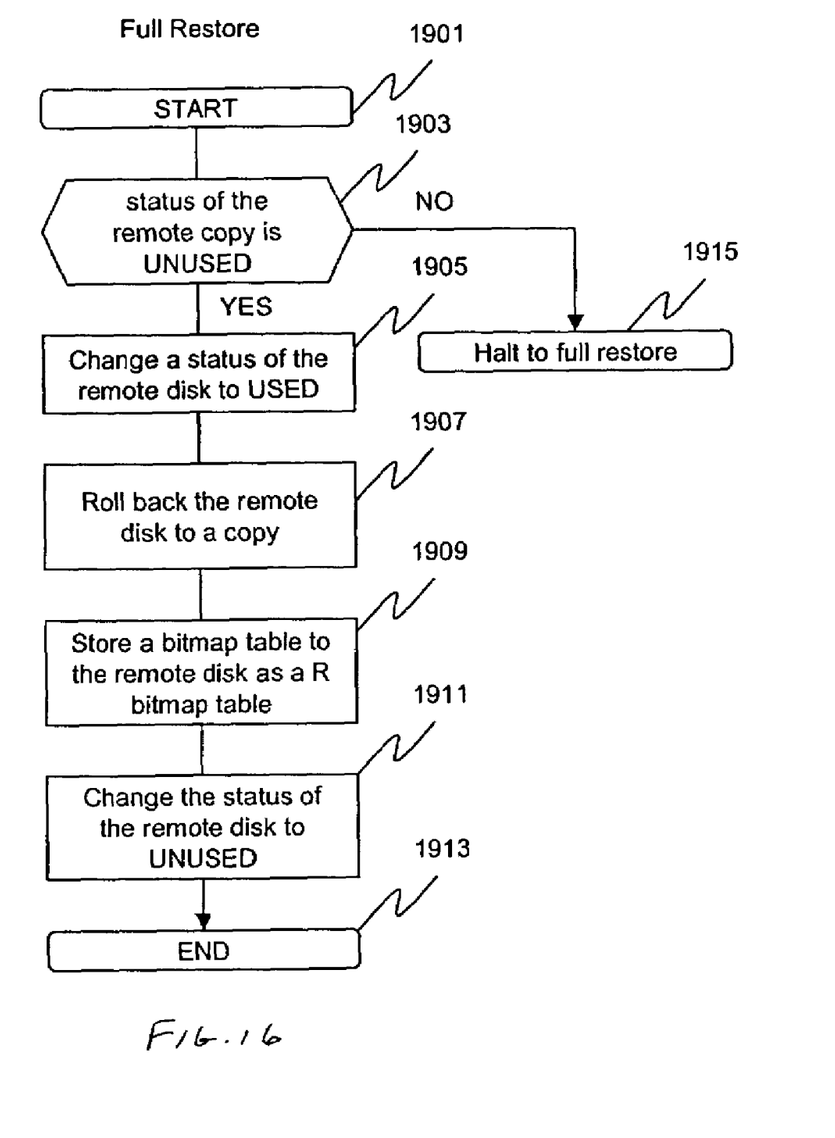

FIG. 16 shows a flowchart highlighting the processing which occurs during a restore operation. The status of the remote disk is checked in a step 1903 to determine its availability. If the remote disk is USED, then the process stops (step 1915). Otherwise, the remotedisk is mounted by the CDM 0501 and set to USED in a step 1905. A conventional restore operation can then be performed to roll back the remote disk image to a previously backed up copy in a step 1907. The R bitmap is then updated accordingly to reflect the blocks on the remote disk that have been changed (step 1909). The remote disk is then unmounted in a step 1911. When the corresponding PC boots up, the Sync daemon will eventually copy the contents of remote disk to its local drive, thus effecting the same restore operation to the local drive.

It can be appreciated that the specific arrangements which have been described herein are merely illustrative of the many implementations in accordance with embodiments of the invention. Numerous modifications may be made by those skilled in the art without departing from the true spirit and scope of the invention as set forth in the following claims.

What is claimed is:

1. A data management method for a local disk drive in a personal computer (PC) comprising:
   in a remote disk drive element associated with the personal computer, modifying one or more data blocks including recording first information indicating that the one or more data blocks of the remote disk drive element have been modified;
   communicating at least some of the first information to the PC;
   selectively communicating second information contained on the remote disk drive element to the PC based on said at least some of the first information so that the PC performs a boot up sequence using the second information;
   subsequent to the PC booting up, receiving one or more read requests from the PC to read the one or more data blocks from the remote disk drive element;
   in response to the one or more read requests, communicating the one or more data blocks from the remote disk drive element to the PC, the PC storing the one or more data blocks in its local disk drive so that a disk image stored on the remote disk drive element is reproduced on the local disk drive;
   during operation of the PC, modifying one or more data blocks on the local disk drive; and
   transmitting the one or more data blocks on the local disk drive to the remote disk drive element, thereby maintaining a disk image of the local disk drive on the remote disk drive element.

2. The method of claim 1 wherein the first information is contained in a bitmap stored on the remote disk drive element.

3. The method of claim 1 wherein the remote disk drive element is partitioned to store two or more disk images, including the disk image of the local disk drive.

4. The method of claim 1 further including receiving a request from the PC to access the remote disk drive; determining whether the remote disk drive element is being used; and transmitting a negative response in response to the access request if the remote disk drive is being used thereby halting the boot up sequence in the PC.

5. The method of claim 1 wherein the step of modifying the one or more data blocks on the local disk drive element and the step of transmitting are performed independently of each other.

6. The method of claim 1 wherein the step of modifying the one or more data blocks on the remote disk drive element is performed in response to a virus check operation on a plurality of data blocks on the remote disk drive.

7. A data management system for managing data in a personal computer (PC) comprising:
   remote data means for providing data storage, the remote data means comprising a plurality of data blocks, the remote data means including first information indicative of one or more data blocks of the remote data means that have been modified;
   communication means for communicating with the PC;
   computer means for data processing coupled to the remote data means and to the communication means; and
   computer program code suitable for execution by the computer means, the computer program code comprising:
   first program code to operate the computer means to communicate at least some of the first information to the PC;
   second program code to operate the computer means to selectively communicate second information contained on the remote data means to the PC to perform a boot up sequence of the PC based on said at least some of the first information, the second information being used to perform the boot up sequence;
   third program code to operate the computer means to receive one or more read requests from the PC, subsequent to the boot up sequence, to read the one or more data blocks from the remote data means;
   fourth program code to operate the computer means to communicate, in response to the one or more read requests, the one or more data blocks from the remote data means to the PC, wherein the PC stores the one or more data blocks in a local disk drive contained in the PC so that a disk image stored on the remote data means is reproduced on the local disk drive; and
   fifth program code to operate the computer means to receive one or more data blocks from the PC during operation of the PC and to store the received one or more data blocks on the remote data means, thereby maintaining a disk image of the local disk drive on the remote data means.

8. The system of claim 7 wherein the first information is contained in a bitmap stored on the remote data means.

9. The system of claim 7 wherein the remote data means is partitioned to store two or more disk images, including the disk image of the local disk drive.

10. The system of claim 7 further including virus checking program code suitable for execution on the computer.

* * * * *